United States Patent Office 3,282,706
Patented Nov. 1, 1966

3,282,706
SUCROSE-AMMONIATED GLYCYRRHIZIN SWEETENING AGENT
Robert E. Muller and Robert J. Morris, Jr., Cherry Hill, N.J., assignors to MacAndrews & Forbes Company, Camden, N.J., a corporation of New Jersey
No Drawing. Filed Nov. 23, 1964, Ser. No. 413,351
1 Claim. (Cl. 99—141)

The present invention relates to the potentiation of the sweetness of sucrose and to sucrose-containing edible materials in which the sweetness imparted by the sucrose is potentiated by means of a small amount of a synergistic potentiating agent whereby the amount of sucrose required to provide a given level of sweetness may be substantially reduced.

Much effort has been devoted in recent years to the development of low calorie sweeteners in order to eliminate (or at least substantially reduce) common sugar (sucrose) as a sweetener in foods, beverages and confections. The saccharins, which have a sweetness value about five hundred times greater than that of sucrose, and the cyclamates, which have a sweetness value about thirty times that of sucrose, have been widely used in this respect. However, sweeteners like these have certain undesirable features, like objectionable flavor or after-taste and the fact that they are synthetic materials.

It is the principal object of the present invention to provide a means for potentiating the sweetness of sucrose.

It is another object of the invention to provide a means for potentiating the sweetness of sucrose through the use of an essentially naturally occurring material.

Still another object of the invention is to potentiate the sweetness of sucrose with a very small amount of an essentially naturally-occurring material whereby the amount of sucrose required to sweeten any edible material to a given level may be markedly reduced with substantially quantitative reduction of the caloric content of the edible material.

A further object is to provide novel sucrose-containing edible materials (foods, beverages and confections) containing a small amount of a sucrose potentiating agent in which the amount of sucrose is markedly less, for a given sweetness level, than that required in the same edible material without the potentiating agent.

Other objects, including the provision of a novel sweetening agent, will become apparent from a consideration of the following specification and claims.

Licorice is a material long well known and widely used in many fields. The licorice root contains from about 6 to about 14% of a triterpenoid glycoside called glycyrrhizin. This compound is present in the root as the mixed calcium and potassium salt of glycyrrhizic acid.

Glycyrrhizin has a sweetness value about 50 times greater than that of sucrose and is perhaps the sweetest chemical processed commercially that is found in nature. Glycyrrhizic acid is obtained in 90% or more purity (Hausman assay) by grinding the root, extracting the ground material with hot water, and treating the extract to recover the acid insoluble fraction containing the glycyrrhizic acid. Glycyrrhizic acid can be ammoniated, to provide ammoniated glycyrrhizin, by replacing one or more of the three acid hydrogen atoms with ammonium. Ammoniated glycyrrhizin, therefore, ranges from a mono-ammoniated product to an essentially fully (tri) ammoniated product and mixtures thereof. Ammoniated glycyrrhizin is well known and widely used, and also has a sweetness value about 50 times that of sucrose.

Ammoniated glycyrrhizin, of course, has the characteristic licorice flavor and it is primarily for this that this material has found widespread use as flavoring agent in, for example, confections. Because of the licorice flavor this material has not been used alone as sweetening agent except in some licorice-flavored confections, since the amount required for sweetening also imparts the characteristic licorice flavor. This material has also been used in very minute quantities as a foaming agent in beverages.

It has been found, however, and it is upon this that the present invention is based, that ammoniated glycyrrhizin potentiates the sweetness of sucrose in sucrose-containing foods, confections and beverages at levels which do not impart appreciably the licorice flavor. By "potentiate" is meant that the sweetness value of the combination of surcose and ammoniated glycyrrhizin is over and above the sum or mere additive effects of the known sweetness values and is, therefore, the result of synergism between the sucrose and ammoniated glycyrrhizin in certain relative proportions of one to the other. This will be illustrated hereinafter.

Accordingly, the present invention includes a method for potentiating the sweetness of sucrose, including sucrose in sucrose-containing edibles, by incorporating therein a small amount of ammoniated glycyrrhizin sufficient to provide a resulting sweetness value in excess of the sum of the known individual sweetness values of sucrose and ammoniated glycyrrhizin but insufficient to provide the flavor of licorice.

The invention also includes novel edible materials (foods, beverages and confections) containing sucrose and ammoniated glycyrrhizin in the stated relative amounts.

The present invention further includes novel sweetening agents consisting essentially of sucrose and ammoniated glycyrrhizin in which the ammoniated glycyrrhizin and sucrose are in the stated relative amounts.

The following examples are given for the purpose of illustration only and are not intended to limit the scope of the invention in any way.

Example I

A root beer-flavored soft drink beverage which normally contains 12% by weight, of sucrose is prepared using: (A) 8% of sucrose and 0.04% of ammoniated glycyrrhizin, and (B) 5% of sucrose and 0.08% of ammoniated glycyrrhizin. Both beverages A and B had a sweetness equivalent to the normal 12% sucrose beverage. However, using known sweetness values for sucrose and ammoniated glycyrrhizin, the sweetening value computed from mere additive effects would be equivalent to 10% sucrose in A and 9% sucrose in B.

Example II

A cake whose recipe calls for 2 cups of sucrose (450 grams) is prepared using 1 cup of sucrose (225 grams) and ½ teaspoon of ammoniated glycyrrhizin (1 gram). The cake had a sweetness equivalent to the same cake prepared from 2 cups of sucrose. However, using known sweetness values, the sum of the sweetening values, if merely additive, should be equivalent to 1½ cups of sucrose.

Example III

Five parts by weight of ammoniated glycyrrhizin are thoroughly mixed with 500 parts of sucrose to form a sweetening agent. When used as a sweetening agent in beverages, confections, and foods, this sweetener is equivalent to 1000 parts of sucrose. On the basis of known sweetening values, this sweetener should be equivalent to 750 parts of sucrose. As a sweetening agent, this material may be mixed with a diluent or extender, like water, invert sugar, corn syrup, and the like, which does not alter its sweetening properties.

For example, a mixture of 333 parts by weight of sucrose, 665 parts of corn syrup and 2 parts of ammoniated glycyrrhizin is equivalent in sweetness to 1000 parts of sucrose. However, on the basis of the known sweetening values (the corn syrup having a sweetness value of 40% of that of sucrose), this mixture should be equivalent to 767 parts of sucrose.

*Example IV*

This example illustrates the use of the sweetening agent described in the preceding example. A caramel confection is prepared from

| | |
|---|---|
| Corn syrup _____grams__ | 1470 |
| Sucrose _____do____ | 1000 |
| Ammoniated glycyrrhizin _____do____ | 2 |
| Butter _____do____ | 230 |
| Evaporated milk _____liters__ | 2.7 |
| Salt _____grams__ | 3 |
| Vanillin _____do____ | 0.5 |

The regular recipe without the ammoniated glycyrrhizin calls for 1350 grams of corn syrup and 1350 grams of sucrose.

Flavored carbonated and non-carbonated beverages (grape-, strawberry-, orange- and root beer-flavored) were prepared using varying proportions of sucrose and ammoniated glycyrrhizin to determine the range of proportions of ammoniated glycyrrhizin to sucrose to provide the synergistic potentiation of the sweetness of sucrose without imparting significant licorice flavor. These preparations were then subjected to sensory testing by a taste panel using the "rank order test" and the "scalar difference from control test" as described in Food Technology, vol. 18, No. 8, August 1964, pages 25–31. As the result it was determined that the critical proportions are not less than 0.2 and not more than 2.2 parts, by weight, of ammoniated glycyrrhizin per 100 parts, by weight, of surcrose.

As will be apparent from the foregoing the amount of ammoniated glycyrrhizin incorporated in the edible material is related to the sucrose content which determines the sweetness level for the particular food, beverage or confection. As will also be apparent, the particular edible sweetened in accordance with the present invention is not material, and any normally sucrose-sweetened food, beverage or confection is applicable.

Modification is possible in the edible materials selected and sweetened according to the present invention as well as in the particular techniques employed without departing from the scope of the invention as defined by the following claim.

What is claimed is:

A sweetening agent consisting essentially of sucrose and ammoniated glycyrrhizin in which the ammoniated glycyrrhizin is present in an amount not less than 0.2 nor more than 2.2 parts, by weight, per 100 parts, by weight, of sucrose to provide a resulting sweetness value in excess of the sum of the known individual sweetness values of surcrose and ammoniated glycyrrhizin but insufficient to impart the flavor of licorice.

References Cited by the Examiner

UNITED STATES PATENTS 2,761,783   9/1956   Ferguson _____ 99—141

OTHER REFERENCES

Houseman et al., Industrial and Engineering Chemistry, October 1929, page 916.

Mitchell, Wm., Manufacturing Chemist, 1956, page 169.

Neiman, C., Advances in Food Research, 1957, pages 346 and 348.

A. LOUIS MONACELL, *Primary Examiner.*

RAYMOND N. JONES, S. E. HEYMAN,
*Assistant Examiners.*